Patented Aug. 19, 1947

2,425,842

UNITED STATES PATENT OFFICE 2,425,842

TREATMENT OF EQUIPMENT

Wilson D. Seyfried, Wooster, and James C. Schiller, Goose Creek, Tex., assignors to Standard Oil Development Company, a corporation of Delaware No Drawing. Application November 10, 1944, Serial No. 562,918

2 Claims. (Cl. 260—680)

The present invention is directed to the treatment of equipment for processing dienes at elevated temperature.

In the operation of equipment for processing dienes, such as butadiene and other diolefins, difficulty is encountered due to the formation of polymers in the equipment. This is a particularly frequent occurrence in fractionating towers, where the formation of high molecular weight resin-like polymers on the heat exchange surfaces, bell caps, bell cap trays, downcomers, etc., is a constant source of trouble. Once started, the formation of this material is quite rapid and has frequently resulted in shutdowns because of plugging. In some cases serious damage to equipment has resulted when the polymer growth was inadvertently allowed to proceed to such an extent that steel tube bundles, bubble cap trays and other elements were distorted because of excessive pressure.

A careful study has indicated that the formation of these polymers is caused by the presence of oxygen in the equipment, and is accelerated by the presence of "seed" polymer particles. These difficulties are especially noticeable when the equipment is put back into operation after a shutdown during which it is exposed to air. Elaborate precautions have been taken to remove air by purging or evacuation from such processing equipment prior to putting it into service. It is impossible by these methods, however, entirely to remove the last traces of oxygen that are caught in pockets under bell caps or absorbed on the walls of the equipment or otherwise trapped in the equipment. In addition, if polymer has been formed in operations preceding the shutdown, it is extremely difficult to remove all traces of this polymer from the equipment even by the most careful cleaning procedures. When exposed to air during shutdowns, the "seed" polymer particles will absorb oxygen and, when operations are resumed, will act as nuclei for the rapid formation of additional quantities of polymers.

According to the present invention these difficulties are eliminated by a simple expedient. The present invention contemplates the circulation through such equipment prior to putting it into service of an organic liquid free from oxygen, carrying in solution an oxidation inhibitor in moderate concentrations, such as 100 to 1,000 parts per 1,000,000. The liquid so circulated through the equipment should be used in sufficient quantity to fill the equipment. This liquid can be any anhydrous oxygen-free liquid which does not react with the diene to be processed and will not interfere with the processing thereof. The liquid which readily suggests itself as most practical is the diene itself which is to be processed.

For example, where a diene is to be fractionated in a fractionator which has been exposed to air, the fractionator is filled with the diene containing from about 100 to 1,000 parts per 1,000,000 of an oxidation inhibitor, and the liquid is circulated through the fractionating equipment for a period of several hours, as for example 2 to 4 hours. By this treatment any oxygen in the equipment reacts with the inhibitor to form oxidation products and is no longer available as a catalyst for polymerization. After the pretreatment is completed, the diene used for the pretreatment can be fractionated in the usual manner followed by further continuous operation with fresh quantities of diene. Periodic washings of the equipment with diene containing oxidation inhibitor will keep the equipment in good working order and eliminate the difficulties heretofore occasioned by polymer formation.

Any commonly known oxidation inhibitor can be employed. Typical examples are tertiary butyl catechol, phenolic bodies derived from petroleum, hydroquinones, hydroxybenzoic acids and the like. Alternatively or concurrently with the use of oxidation inhibitors, there may be incorporated in the washing liquid a substance which readily takes up oxygen.

The nature and objects of the present invention having been fully described, what we wish to claim as new and useful and to secure by Letters Patent is:

1. A method for preparing equipment for the fractionation of butadiene which comprises circulating butadiene in liquid form carrying an oxidation inhibitor capable of taking up oxygen through said equipment for a period of time sufficient to eliminate oxygen from said equipment, proceeding with the fractionation and subsequently periodically washing said equipment during said fractionation with butadiene in liquid form containing an oxidation inhibitor capable of taking up oxygen.

2. A method according to claim 1 in which the circulation period is from 2 to 4 hours.

WILSON D. SEYFRIED.
JAMES C. SCHILLER.

REFERENCES CITED

The following references are of record in the file of this patent:

UNITED STATES PATENTS

| Number | Name | Date |
|---|---|---|
| 1,978,562 | Benner | Oct. 30, 1934 |
| 2,260,475 | Murke | Oct. 28, 1941 |

OTHER REFERENCES

Starr, Jr. Nat. Pet. News, Nov. 3, 1943, R-521, R-522, R-524, R-525. (Patent Office Library.)

Scott, "Ind. Eng. Chem., News Edition," vol. 18, No. 9, page 404 (1940). (Copy in Scientific Lib.) 260—681.5.

"Chemical and Metallurgical Engineering," Nov. 1942, pages 117–119. (Copy in Scientific Library.) 260—666.5.

Karrer, "Organic Chemistry" (1938), pages 400–401, distributed by Nordeman Pub. Co., Inc., N. Y. (Copy in Div. 50.)